United States Patent [19]

Meier

[11] Patent Number: 5,533,660

[45] Date of Patent: Jul. 9, 1996

[54] EXPANSION DOWEL AND EXPANSION DOWEL SETTING TOOL

[75] Inventor: Peter Meier, Lüchingen, Switzerland

[73] Assignee: Hilti Aktiengesellschaft, Schaan, Liechtenstein

[21] Appl. No.: 393,299

[22] Filed: Feb. 23, 1995

[30] Foreign Application Priority Data

Feb. 28, 1994 [DE] Germany .................. 44 06 423.3

[51] Int. Cl.⁶ .................................................. B25C 7/00
[52] U.S. Cl. ............................................. 227/147; 411/54
[58] Field of Search ................. 81/20, 44; 411/54 X, 411/60; 227/147 X, 109, 142; 173/20; 29/275, 255

[56] References Cited

U.S. PATENT DOCUMENTS

| D. 267,469 | 1/1983 | Crowder | 227/147 |
|---|---|---|---|
| 776,393 | 11/1904 | Harriman | 227/147 |
| 2,866,974 | 1/1959 | Hoffman | 227/147 |
| 3,965,794 | 6/1976 | Dorgnou | 411/54 |
| 4,037,632 | 7/1977 | Arena | 227/147 |
| 4,642,008 | 2/1987 | Herb | 411/54 |
| 4,818,163 | 4/1989 | Bereiter | 411/54 |
| 5,060,359 | 10/1991 | Muir | 81/44 |
| 5,085,546 | 2/1992 | Fischer | 81/44 |

*Primary Examiner*—Steven N. Meyers
*Assistant Examiner*—Gary Estremsky
*Attorney, Agent, or Firm*—Anderson Kill Olick & Oshinsky

[57] ABSTRACT

An expansion dowel is formed of an axially extending sleeve (1) with a cylindrically-shaped outside surface. A setting tool for expanding the sleeve includes an axially extending handle part (2) holding an axially extending striking part (3). The handle part (2) has an axially extending recess (2b) with a concave-shaped base in its outside surface. The axial length (L) of the recess (2b) is substantially the same as the axial length (1) of the sleeve. A clearance-free seating of the expansion dowel into the recess (2b) indicates to the tool operator that a correct expansion dowel is being used with the tool for assuring a proper expansion of the dowel.

4 Claims, 1 Drawing Sheet

EXPANSION DOWEL AND EXPANSION DOWEL SETTING TOOL

BACKGROUND OF THE INVENTION

The present invention is directed to an expansion dowel and an expansion dowel setting tool where the expansion dowel has a cylindrically-shaped outside surface and the expansion dowel setting tool is formed of a handle part and a striking or driving part.

Expansion dowels of the type including the present invention have an expansion sleeve with an anchoring region which can be expanded by an expansion element. The outside surface of the expansion dowel is substantially cylindrical so that the sleeve forming the dowel, which may profiled surfaces thereon, is basically a cylinder.

Expansion dowels of the type disclosed herein are used in particular for high quality attachments. Accordingly, such expansion dowels are formed of metal and have a load engagement means, for instance in the form of a thread, in the trailing end region of the sleeve. For the most part, the leading or anchoring end region of the expansion dowel is provided with slots open at the leading end. The expansion element can be in the shape of a cylinder or a cone and cooperates with a bore in the expansion sleeve which tapers inwardly toward the leading end, whereby an axial displacement of the expansion element towards the leading end expands the sleeve in the anchoring region.

To achieve a high quality attachment of the expansion dowel of the type disclosed herein, an adequate installation safety margin is important. Such a safety margin is attained if it is assured that an optimum expansion in the anchoring region is achieved. Such optimum expansion depends upon the travel of the expansion element. This travel of the expansion element assures the installation safety margin of the dowel and depends on the arrangement of the expansion dowel.

It is known to utilize expansion dowel setting tools for expanding the dowel, that is, for driving the expansion element. These expansion dowel setting tools have a handle with a striking or driving part. The striking part transmits the force produced by hammer blows to the expansion element. To assure that the expansion element is moved through the distance required for the respective expansion dowel, the striking part of the known expansion setting tools has a shoulder arranged to abut the trailing end face of the expansion dowel for limiting the axial travel of the expansion element. After the shoulder bears against the trailing end face of the expansion dowel it is assured that the expansion element has been displaced through the required travel distance for the respective expansion dowel whereby the required installation margin of safety is achieved affording the correct expansion of the dowel.

Since, as already mentioned, the movement or displacement of the expansion element is a function of the design of the expansion dowel, for instance its dimensions, it is necessary to provide a special expansion dowel setting tool for each type of expansion dowel to be used to assure the proper expansion required for the appropriate installation margin of safety. Due to the problem arising from the great number of the required expansion dowel setting tools, there is the possibility that an incorrect expansion dowel setting tool, not matching the corresponding expansion dowel, may be used. The consequence of such an improper combination is an insufficient or excessive expansion whereby the required installation margin safety is not attained.

SUMMARY OF THE INVENTION

Therefore, the primary object of the present invention is to provide an arrangement which indicates to the tool operator that the correct expansion dowel setting tool is used with the corresponding expansion dowel.

In accordance with the present invention, the handle part of the setting tool has at least one axially extending recess with a concave-shaped base, whereby the axial length of the recess corresponds to the axial length of the expansion dowel and the base has a radius of curvature corresponding to half the diameter of the outside surface of the expansion dowel.

The concave-shaped recess in the handle part of the expansion dowel embodying the present invention affords a clearance-free, partial seating of a specific expansion dowel. Since the correct displacement of the expansion element for affording the proper installation margin of safety of the specific expansion dowels is known, the striking part can be correspondingly adjusted by the correct position of the shoulder.

The clearance-free partial seating of the expansion dowel in the concave-shaped recess confirms for the tool operator that he is using the correct expansion dowel setting tool for the particular expansion dowel. If the expansion dowel setting tool is used with an expansion dowel of greater dimensions, the expansion dowel cannot be inserted into the concave-shaped recess because of its length and also due to its curvature. On the other hand, if the expansion dowel setting tool is used with a smaller expansion dowel, there is a clearance of the expansion dowel within the concave-shaped recess with regard to its length and also to its curvature. Accordingly, the tool operator is afforded a visual signal of the improper tool for use with the expansion dowel.

The maximum depth of the recess corresponds at most to half the outside diameter of the expansion dowel for assuring that the expansion dowel can be properly introduced into the concave-shaped recess and can also be removed without any difficulty. A clearance with expansion dowels of insufficient size or of oversize can be easily recognized, if the maximum depth of the recess preferably corresponds to 0.2 to 0.4 times the outside diameter of the expansion dowel.

Several advantages are evident as far as handling by the operator is concerned if the axial length of the recess extends parallel to the axis of the handle part. Further, in such an arrangement of the recess, the grip of the operator is not interfered with in any manner.

In most cases, a separate expansion dowel setting tool is required for each different diameter as well as for each different axial length of the expansion dowel. In each of these cases there is a concave-shaped recess in the handle part of the expansion dowel setting tool matched exactly to the outside surface of the expansion dowel. In certain cases, however, it is possible to use the same expansion dowel setting tool for a range of expansion dowels having the same diameter but different lengths, since the expansion movement of the expansion elements remains the same, because the expansion behavior can be compensated by different arrangements of the expansion elements. Accordingly, in such cases the same expansion dowel setting tool can be used for expansion dowels having a range of lengths.

In such an arrangement with the concave-shaped recess as an auxiliary means, there is the possibility of providing the recess with markings for the different lengths or of shaping one end face of the recess in a stepped manner with each step corresponding to a length of the particular expansion dowel which is to be used.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
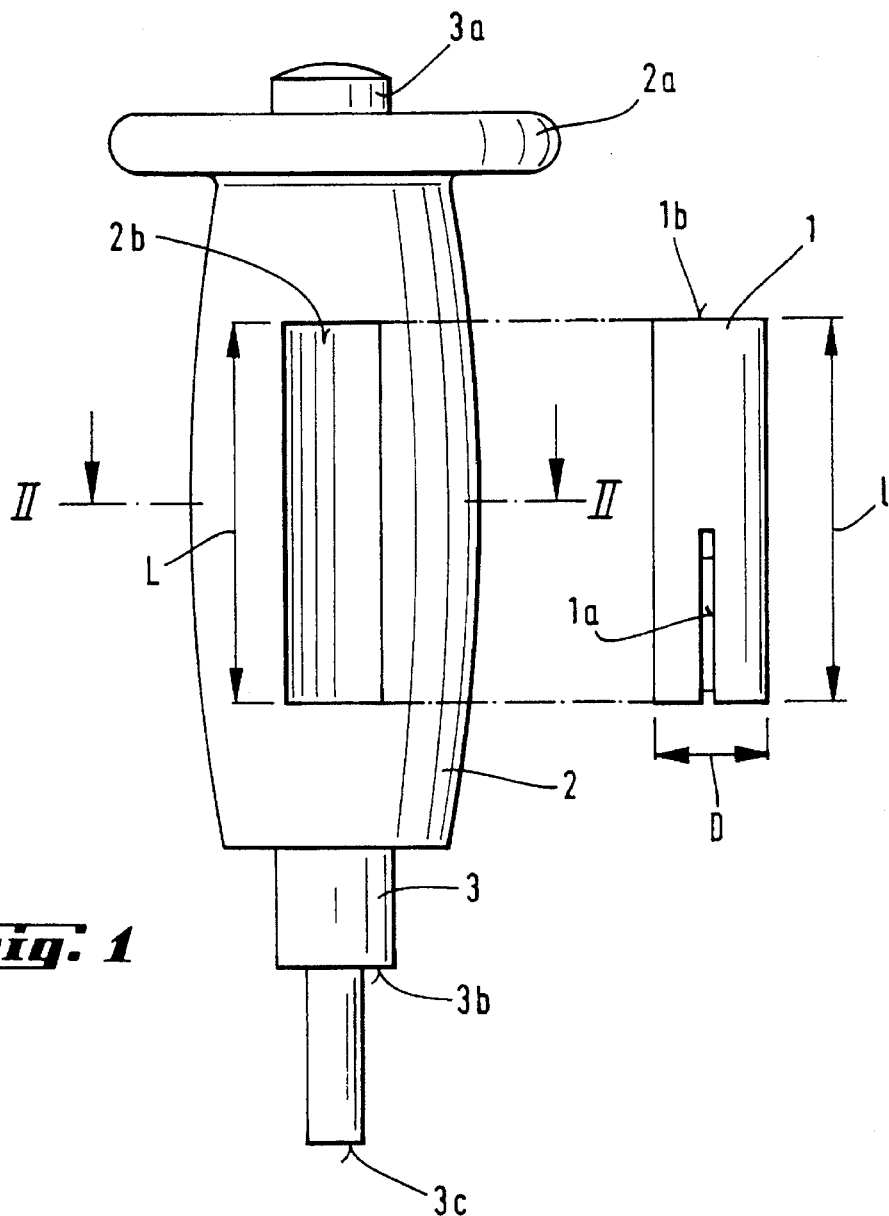
FIG.1 is an elevational view of an expansion dowel and of a proper expansion dowel setting tool for the dowel.

FIG. 1 is an elevational view of an expansion dowel, shown on the right, with an expansion dowel setting tool, shown on the left, properly dimensioned for expanding the dowel.

The expansion dowel comprises an axially extending, cylindrically-shaped expansion sleeve 1 having a leading end, the lower end, and a trailing end, the upper end. The expansion sleeve 1 has an anchoring or expansion region containing axially extending slits 1a. The expansion region affording the requisite anchorage of the dowel, can be expanded by an expansion element located within the expansion sleeve 1. The expansion element is not shown and is of conventional design.

The expansion dowel setting tool includes an axially extending handle part 2 containing a striking part or drives 3. The striking part 3 extends axially through the handle 1 and at its trailing end 3a extends axially outwardly from the handle part 2. Accordingly, the driving action provided by hammer blows directed against the trailing end 3a are transferred to the leading end 3c of the striking part. The leading end region of the striking part 3 extends axially outwardly from the handle part 2. Between the leading end 3c of the striking part 3 and the handle part 2 there is a shoulder 3d for limiting the axial displacement of the expansion element within the expansion sleeve 1. When the shoulder 3b contacts the trailing end face of the expansion sleeve 1, the operator is signalled that the proper displacement of the expansion element has been effected.

As shown in FIG. 1, the handle part 2 has a laterally extending flange 2a for protecting the hand of the tool operator, particularly if the blows directed against the trailing end 3a of the striking part 3 are provided by hammer blows. In addition, the handle part 2 has a concave-shaped recess 2b in its outside surface. The handle part 2 has an axial length L corresponding to the length 1 of the expansion sleeve 1 of the expansion dowel.

Figure 2:
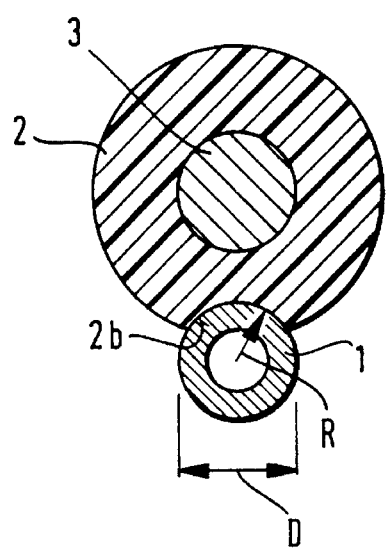
FIG. 2 is transverse cross-sectional view taken along the line II—II in FIG. 1 of the expansion dowel setting tool with the expansion dowel seated in a recess of the tool.

As can be noted in FIG. 2, the concave-shaped recess 2b has a radius of curvature corresponding to half of the outside diameter D of the expansion sleeve 1 of the expansion dowel. In FIG. 2 it is shown that the proper insertion of the expansion sleeve 1 of the expansion dowel into the concave-shaped recess 2b in the outside surface of the handle part 2 assures that the proper setting tool is used with the expansion dowel. In FIG. 2 the expansion dowel, the expansion sleeve 1, the handle part 2 and the striking part 3 are shown in section. As illustrated in an exemplary manner, the handle part 2 of the expansion dowel setting tool is formed of a plastics material while the striking part 3 extending through the handle part 2 is formed of metal. The materials forming the expansion dowel setting tool can be varied, for instance the tool can be constructed as a single piece formed of metal.

For reasons of strength or stiffness, the expansion dowels are formed of metal.

While a specific embodiment of the invention has been shown and described in detail to illustrate the inventive principles, it will be understood that the invention may be embodied otherwise without departing from said principles.

I claim:

1. Expansion dowel and expansion dowel setting tool wherein said expansion dowel comprises an axially extending sleeve having a cylindrically-shaped outside surface, said setting tool comprises an axially extending handle part (2) having an outside surface and an axially extending striking part (3) mounted in said handle part, wherein the improvement comprises at least one axially extending recess (2b) having a concave-shaped base located in the outside surface of said handle part, said recess has an axial length (L), said sleeve has an axial length (1), the axial length (1) of said sleeve is substantially equal to the axial length (L) of said recess, said outside surface of said sleeve has a diameter (D) and the concave-shaped base of said recess (2b) has a radius (R) substantially equal to half of the diameter (D) of the outside surface of said sleeve.

2. Expansion dowel and expansion dowel setting tool, as set forth in claim 1, wherein the maximum depth of the concave shaped base of said recess (2b) inwardly from the outside surface of said handle part corresponds at most to half the outside diameter (D) of said expansion sleeve (1).

3. Expansion dowel and expansion dowel setting tool, as set forth in claim 2, wherein the maximum depth of said recess (2b) is in the range of 0.2 to 0.4 times the outside diameter (D) of said expansion sleeve.

4. Expansion dowel and expansion dowel setting tool, as set forth in one of claims 1 to 3, wherein the axial extent of said recess (2b) is parallel to the axial direction of said striking part (2).

\* \* \* \* \*